United States Patent [19]

Morita et al.

[11] Patent Number: 4,745,823

[45] Date of Patent: May 24, 1988

[54] GEAR ASSEMBLY ADAPTED FOR MATING WITH A THIRD GEAR WITHOUT BACKLASH

[75] Inventors: Shuji Morita; Katsujiro Satou, both of Toyota, Japan

[73] Assignee: Toyota Jidosha Kabushiki Kaisha, Aichi, Japan

[21] Appl. No.: 870,073

[22] Filed: Jun. 3, 1986

[30] Foreign Application Priority Data

Jun. 12, 1985 [JP] Japan .............................. 60-87629[U]

[51] Int. Cl.⁴ ............................................. F16H 55/18
[52] U.S. Cl. ......................................... 74/409; 74/440
[58] Field of Search .................... 74/409, 440, 410, 411

[56] References Cited

U.S. PATENT DOCUMENTS

| | | | |
|---|---|---|---|
| 1,197,261 | 9/1916 | Burke | 74/440 |
| 2,902,879 | 9/1959 | Anderson | 74/440 |
| 4,630,496 | 12/1986 | Yasuoka | 74/440 X |
| 4,640,147 | 2/1987 | Yasukawa | 74/440 X |

FOREIGN PATENT DOCUMENTS

| | | |
|---|---|---|
| 116300 | 1/1986 | European Pat. Off. . |
| 889094 | 9/1953 | Fed. Rep. of Germany . |
| 1625596 | 7/1970 | Fed. Rep. of Germany . |
| 3503112 | 8/1985 | Fed. Rep. of Germany . |
| 8201767 | 8/1983 | France . |
| 56-160351 | 2/1945 | Japan . |
| 55-158349 | 5/1954 | Japan . |
| 48-34438 | 10/1973 | Japan . |
| 1078160 | 3/1984 | U.S.S.R. .............................. 74/409 |

OTHER PUBLICATIONS

Engineers Digest, vol. 34, No. 8, Aug. 1973, pp. 23–27; "Circlips and Retaining Rings".

Primary Examiner—Leslie A. Braun
Assistant Examiner—David Novais
Attorney, Agent, or Firm—Kenyon & Kenyon

[57] ABSTRACT

A gear assembly comprising two gears and a spring in the form of a C-shaped clip for applying a resilient force between the gears. Two pins are provided on the respective side surfaces of the gears to receive the spring which has concave end surfaces to be received by the pins. Each of the concave end surfaces is defined by a part of a circle having a center which lies on a line of action of force by the pins.

5 Claims, 2 Drawing Sheets

GEAR ASSEMBLY ADAPTED FOR MATING WITH A THIRD GEAR WITHOUT BACKLASH

BACKGROUND OF THE INVENTION

1. Field of the Invention

The present invention relates to a gear assembly which constitutes a single gear to be mated with a third gear to eliminate backlash therebetween, for reducing noise caused by mated gears. The present invention can be widely applied in a variety of mechanical fields.

2. Description of the Related Art

A conventional non-backlash gear assembly is known in which the assembly comprises two gears and a spring, each end of the spring being anchored to the respective gears to provide a biasing force that will cause the two gears to rotate in opposite directions, so that this gear assembly can be mated with a third gear in a non-backlash manner.

Several types of springs are used for biasing the two gears. For example, a compression coil spring is used in the device shown in FIG. 2 of Japanese Examined Utility Model Publication (Kokoku) No. 48-34438 and in FIG. 1 of Japanese Unexamined Utility Model Publication (Kokai) No. 55-158349. A torsional coil spring is used in Japanese Unexamined Utility Model Publication (Kokai) No. 56-160351, and C-shaped round steel spring is used in FIG. 1 of Japanese Examined Utility Model Publication (Kokoku) No. 48-34438 and in FIG. 3 of Japanese Unexamined Utility Model Publication (Kokai) No. 55-158349. These C-shaped round steel springs have end portions formed at right angles to the plane of the spring.

It is also known to use a C-shaped plate spring. This kind of C-shaped spring is often referred to as a snap ring, and has a specific use. Generally, it has holes in the end portions thereof, and pins are formed on the two gears to engage with holes of the spring when a spring having such holes is used. For example, U.S. Pat. No. 1,197,261 discloses a gear assembly comprising two gears, each having one pin standing thereon, and a leaf spring which is secured at either end to the pins. This known type of gear assembly has a disadvantage in that assembly is difficult, since the C-shaped spring must be arranged between two gears, and the pins and holes, which must be engaged with each other in a narrow gap between the gears, cannot be seen by the operator. To solve this problem, the applicants have found that a spring in the form of C-shape with concave end surfaces in place of the end holes can be received by pins. Namely, if the spring in the form of a C-shape is arranged between two pins in a compressed state, the spring can be supported by the two pins without conventional holes. In this case, the concave end surfaces of the spring are preferably in contact with the pins at substantially one relative position under a load by the pins. If the contacting position shifts, the spring may be dislodged from the pins because it is not retained or enclosed by holes.

SUMMARY OF THE INVENTION

It is an object of the present invention to provide a gear assembly adapted for mating with a third gear in a non-backlash manner, which can be easily assembled. It is a further object of the invention to provide an improved gear assembly adapted for mating with a third gear in a non-backlash manner, which comprises a spring having a generally C-shaped form with concave end surfaces thereon having a profile which is defined in such a manner that the end surfaces of the spring can remain in contact with the pins at a stable position.

According to the present invention, there is provided a gear assembly adapted for mating with a third gear in a non-backlash manner, said assembly comprising: first and second gears superimposed so as to be coaxially and relatively rotatable for mating together with a third gear, the gears having axially spaced side surfaces facing each other; first and second pins standing on the respective side surfaces of the gears at substantially equidistant positions from the common axis of the assembly so that the said pins lie on a common circle about the common axis; and a spring formed in a generally circular arcuate shape and arranged between the gears around the common axis, the spring having concave end surfaces to be received by the first and second pins, respectively, when the gears are relatively rotated so that the pins move apart, each of the concave end surfaces being defined by a part of a circle having a center which lies on a line of action of force exerted by the pins.

BRIEF DESCRIPTION OF THE DRAWINGS

Further features and advantages of the present invention will be described in greater detail in connection with a preferred embodiment of the invention and in reference to the attached drawings, in which.

DESCRIPTION OF THE PREFERRED EMBODIMENTS

Figure 2:
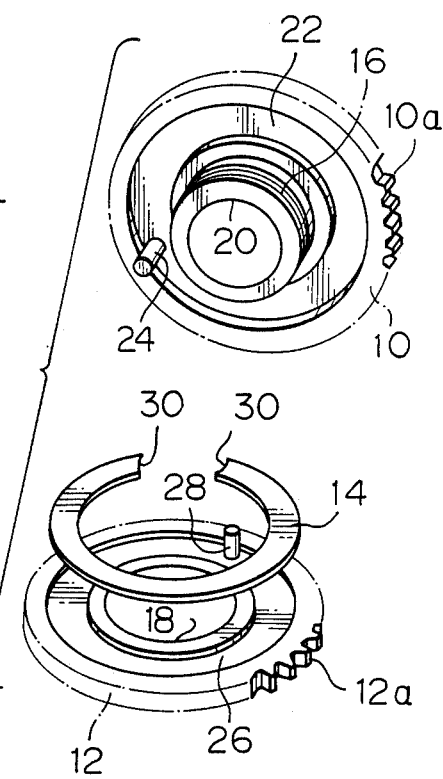
FIG. 2 is an exploded perspective view of the gear assembly according to the present invention.
Figure 6:
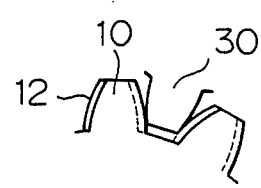
FIG. 6 is a view illustrating the mating relationship of the teeth of the gears of the assembly with teeth of a third year.

In FIG. 2, a non-backlash gear assembly according to the present invention comprises a first main gear 10, a second subgear 12, and a spring 14 in the form of C-shaped clip. This gear assembly as a whole constitutes a single gear means which can be mated with a third gear 32, as shown in FIG. 6. In this mated state, the C-shaped spring 14 biases the gears 10 and 12 relative to each other to cause each tooth of the gears 10 and 12 to resiliently grip each tooth of the third gear 30 and thus eliminate any backlash therebetween.

In FIG. 2, the first gear 10 and the second gear 12 have conventional teeth 10a and 12a on their peripheries, respectively. The tooth profile and the number of the teeth 10a and 12a of each gear 10 and 12 are identical. The spring 14 has a shape such as is known as a retaining ring or a snap ring and comprises a flat and generally circular arcuate shape. The first gear 10 has a cylindrical boss 16 at the central region thereof, to fit the first gear 10 by its internal hole 20 onto a desired shaft. The second gear 12 has a central hole 18 to slidably fit onto the external peripheral surface of the boss 16 of the first gear 10. Thus the first gear 10 and the second gear 12 can be arranged so as to be coaxially and relatively rotatable.

The first gear 10 has a circular groove 22 on its side surface on the side from which the boss 16 projects. A pin 24 stands on the bottom wall of the circular groove 22. The second gear 12 also has a similar groove 26 and a pin 28 standing on the bottom wall of the groove 26. Each end surface 30 of the spring 14 is concave, which is recessed circumferentially inward. With this arrangement, the gears and springs can lie assembled by inserting the C-shape spring 14 into the circular groove 22 of the first gear 10, then superimposing the second gear 12 over the first gear 10 while engaging the boss 16 in the hole 18. In this step, the two pins 24 and 28 can easily self-locate within a gap between the end surfaces 30 of the spring 14, in a side-by-side relationship on a common circle about the axis of the assembly, since the gap between the end surfaces 30 is greater than the sum of the diameters of the two pins 24 and 28. The assembly is readily completed by clipping a snap ring (not shown) into an annular groove provided at the projecting free end of the boss 16.

Upon mating the thus assembled non-backlash gear assembly with the third gear 32, the first gear 10 is caused to rotate relative to the second gear 12 by a predetermined angle. This relative rotation between the gears 10 and 12 causes the pins 24 and 28 of the gears 10 and 12 to move apart and to abut each end surface 30 of the spring 14, respectively, to expand the spring 14 and thus apply a predetermined spring force. Thus the spring 14 deforms generally in a circumferential sense from an initial no load shape into an expanded loaded shape. The dimensions of the circular grooves 22 and 26 of the gears 10 and 12 are such that the spring is properly accommodated in both conditions. The non-backlash gear assembly can be mated with the third gear 32 under the thus-applied predetermined spring force.

Figure 4:
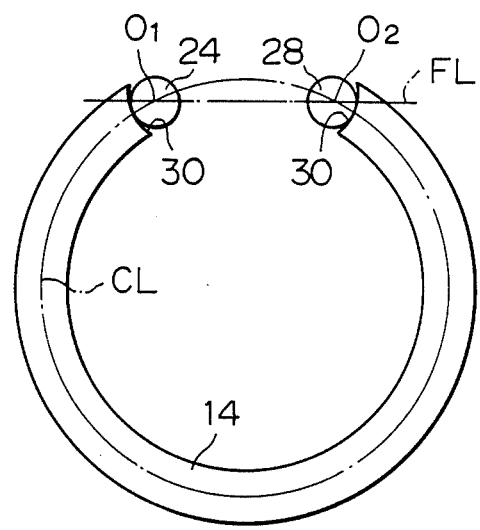
FIG. 4 is a view diagrammatically illustrating a spring and pins of FIG. 2.

FIG. 4 shows pins 24 and 28 and the spring 14 under the thus-applied spring force. Once the non-backlash gear assembly is mated with the third gear 32, the relative displacement between the gears 10 and 12, and accordingly, the relative displacement between the pins 24 and 28, is small (i.e. in the order of backlash) since the corresponding teeth of the first and second gears 10 and 12 are gripped between the adjacent teeth of third gear. Thus the positional relationship between the two pins 24 and 28 can be assumed to be generally constant.

The C-shaped spring 14 may be in light contact with the side surface (i.e., walls defining the circular grooves 22 and 26 in this case) of the gears 10 and 12, but the spring 14 is basically supported only by the two pins 24 and 28.

It will be understood that the direction of the load between the pins 24 and 28 and the spring 14 lies on a line FL connecting the axes $0_1$ and $0_2$ of the pins 24 and 28. The spring 14 has a center line CL. The pins 24 and 28 preferably have a diameter which is approximately equal to the breadth of the spring 14, to provide a satisfactory strength to the pins 24 and 28 and to the spring force of the pins. Of course, this depends on the specific designs to which the non-backlash gear assembly is applied.

Figure 5:
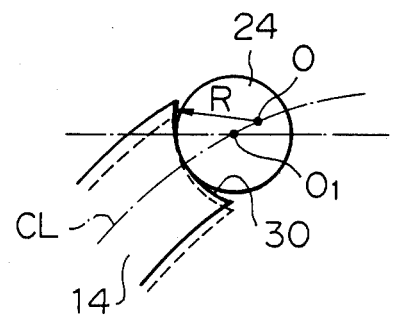
FIG. 5 is a view illustrating a conventional arrangement of a spring and a pin.

It is also preferred that the curvature of the concave end surfaces 30 of the spring 14 has a radius R which is greater than the radius of the pins 24 and 28, to provide a good contact relationship between the end surfaces 30 and pins 24 and 28. In this situation, it is usually preferable to select the curvature of the end surfaces 30 of the spring 14 in such a manner that the center 0 of the curvature of each of the end surfaces 30 lies on an extension line of the center line CL of the spring 14, as shown in FIG. 5. This is based on a conventional design concept having a symmetrical shape. However, in the case of the nonbacklash gear assembly, a tangent line at the contact point between the pin 24 (or 28) and the end surface 30 becomes inclined to the line of action of force FL by the pins 24 and 28 so that a radial component of the force tends to cause the spring 14 to shift relative to the pin 24, as shown in the broken line in FIG. 5. Thus, the spring 14 may be brought into an undesired position in which the spring 14 may be eventually dislodged from the pin 24, or the sharpened edge of the end surface 30 may come into contact with the pin 24 to cause premature wear of the elements, if a sudden impact is applied to the assembly.

Figure 1:
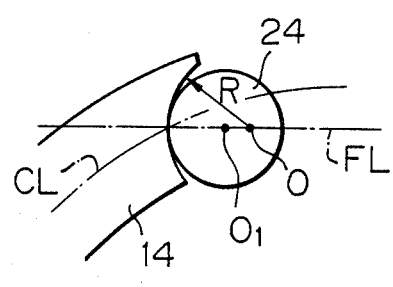
FIG. 1 is a view illustrating an end portion of a spring and a pin, on an enlarged scale, of FIG. 4.
Figure 3:
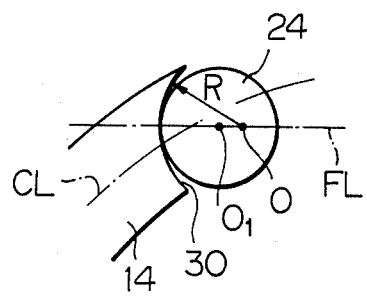
FIG. 3 is a view illustrating a modification of FIG. 1.

According to the present invention, the concave end surface 30 of the C-shape spring 14 is defined by a part of a circle having a center 0 (radius R) which lies on a line of action of force FL, which connects the axes $0_1$ and $0_2$ of the pins 24 and 28 in their working positions, as shown in FIG. 1 or FIG. 3. In addition to this feature, the arrangement in FIG. 1 further ensures that the contact point between the pin 24 and the end surface 30 of the spring lies on the center line CL of the spring 14.

It can be clearly understood that the spring 14 and the pin 24 are in contact at a point on a tangential line substantially perpendicular to the line of action of the force CL, and thereby the spring 14 is free from the component of the force which would cause the spring 14 to shift relative to the pin 24 (or 28). Accordingly, the spring and pins can remain in contact at stable positions, which ensures a reliable operation and long life of the assembly.

We claim:

1. A gear assembly adapted for mating with a third gear in a non-backlash manner, said assembly comprising:
    a first gear and a second gear superimposed so as to be coaxially and relatively rotatable for mating together with a third gear, said first and second gears having axially spaced side surfaces facing each other;
    a first pin and a second pin standing on said respective side surfaces of said gears at substantially equidistant positions from a common axis of the assembly; and
    a spring formed from a flat strip in a generally circular arcuate shape having an axis perpendicular to the plane of the strip and arranged between said first and second gears around the common axis, said spring having concave end surfaces to be received by said first and second pins, respectively, when said first and second gears are relatively rotated so that said pins move apart, each of said concave end surfaces being defined by a part of a circle having a center which lies on a line of action of force exerted by said pins against said concave end surfaces.

2. A gear assembly according to claim 1, wherein said line of action of force is defined by a line connecting the axes of said pins when said pins are in predetermined positions to engage with the concave end surfaces of said spring.

3. A gear assembly according to claim 1, wherein the side surface of at least one of said first and second gears comprises a base of a circular groove sized to accommodate said spring therein, one of said pins starting out from said base of the circular groove.

4. A gear assembly according to claim 3, wherein said first gear has a central boss projecting from said side surface thereof, said second gear having a central hole adapted to slidably fit on said central boss of said first gear.

5. A gear assembly according to claim 2 wherein the line connecting the axes of said pins intersects a central axis of the generally circular spring at the contact points between said pins and the respective concave end surfaces of the spring.

* * * * *

UNITED STATES PATENT AND TRADEMARK OFFICE
CERTIFICATE OF CORRECTION

PATENT NO. : 4,745,823
DATED : 24 May 1988
INVENTOR(S) : Shuji MORITA et al.

It is certified that error appears in the above-identified patent and that said Letters Patent is hereby corrected as shown below:

| Column | Line | Corrections |
|--------|------|-------------|
| 2 | 40 | Change "year" to --gear--. |
| 3 | 8 | Change "lie" to --be--. |
| 3 | 47 | Change "surface" to --surfaces--. |

Signed and Sealed this

Twenty-seventh Day of September, 1988

Attest:

DONALD J. QUIGG

Attesting Officer

Commissioner of Patents and Trademarks